United States Patent

[11] 3,603,134

| [72] | Inventor | Stanley D. Norem<br>Bayside, N.Y. |
|---|---|---|
| [21] | Appl. No. | 14,786 |
| [22] | Filed | Mar. 2, 1970 |
| [45] | Patented | Sept. 7, 1971 |
| [73] | Assignee | The Perkin-Elmer Corporation<br>Norwalk, Conn.<br>Continuation of application Ser. No.<br>645,263, June 12, 1967, now abandoned. |

[54] DETECTOR ARRANGEMENTS FOR ANALYTICAL APPARATUS
9 Claims, 6 Drawing Figs.
[52] U.S. Cl. ................................................. 73/27
[51] Int. Cl. ............................................. G01n 27/18
[50] Field of Search .......................................... 74/27, 24, 25, 26, 28, 29, 30, 23,1, 23; 137/237, 312; 277/135

[56] References Cited
UNITED STATES PATENTS
3,097,520   7/1963   Thompson ..................... 73/27

Primary Examiner—Richard C. Queisser
Assistant Examiner—Ellis J. Koch
Attorney—Edward R. Ayde, Jr.

ABSTRACT: A detector arrangement for use with an analytical instrument includes a cell having a plurality of members which form a detector chamber and a gas-conductive passageway for conveying a sample-carrying gas through the chamber. Sensing means are positioned in a gas flow path in the chamber for sensing the presence of sample constituents in the gas stream. Sealing means are provided for conducting an inert gaseous medium between the chamber and a surrounding atmosphere for reducing gas leakage therebetween.

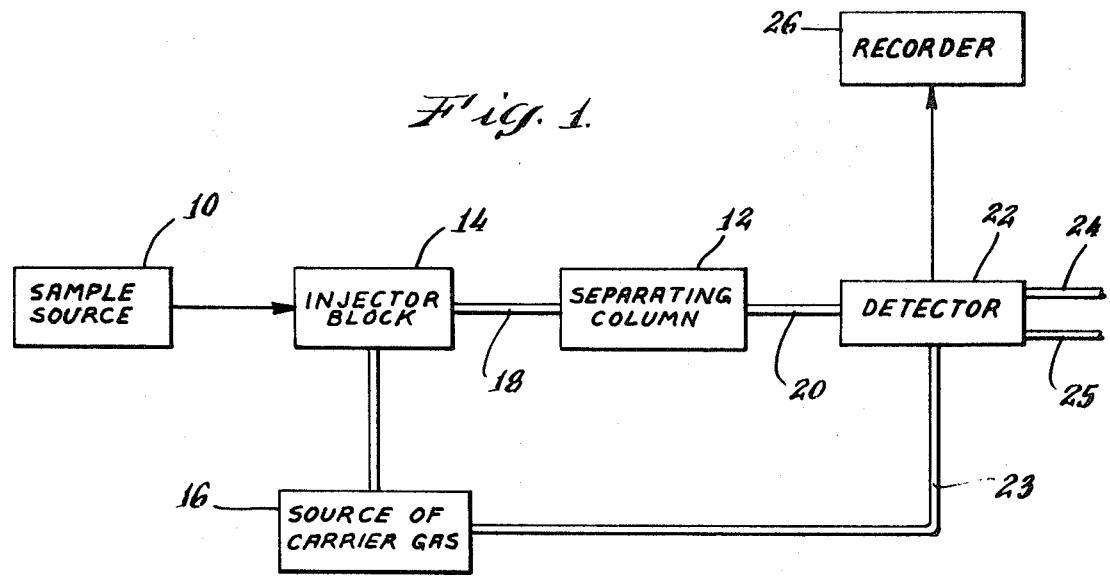
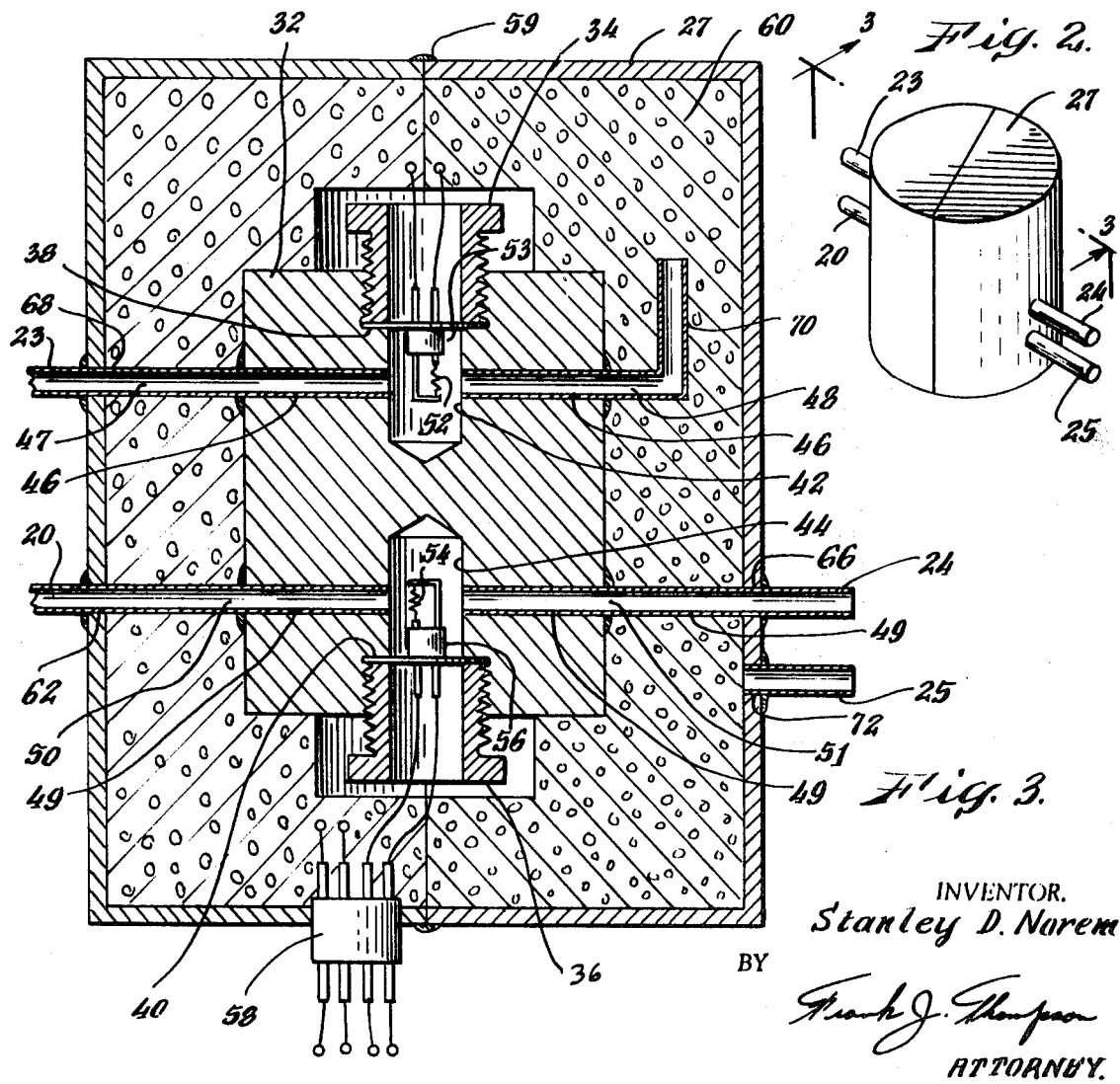

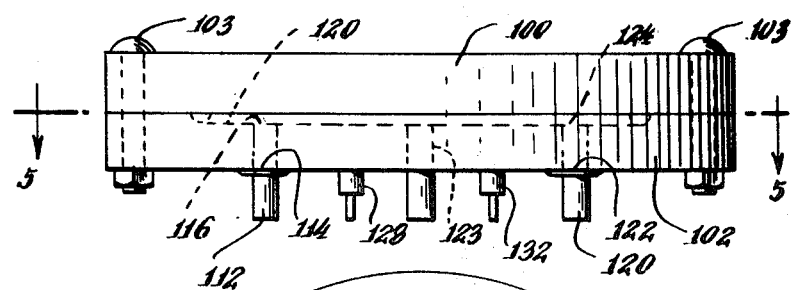
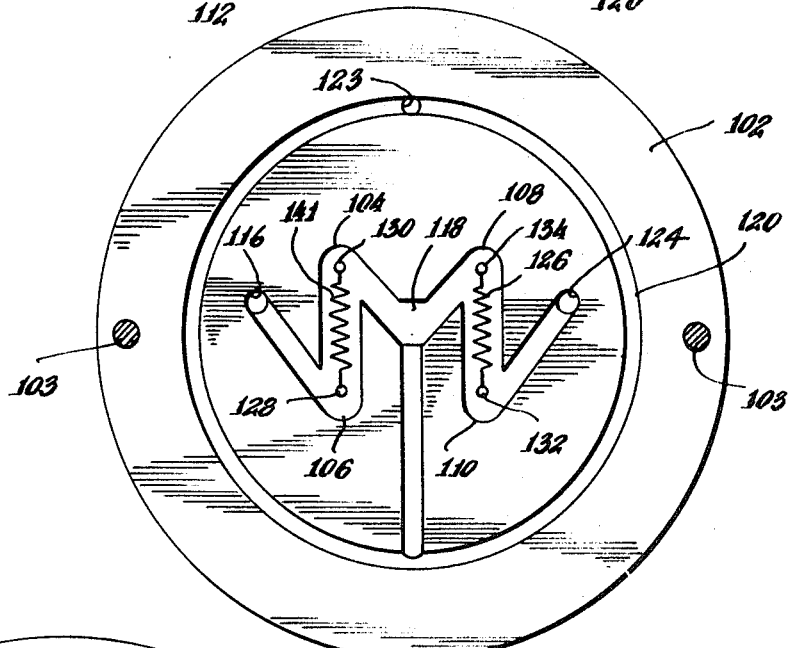
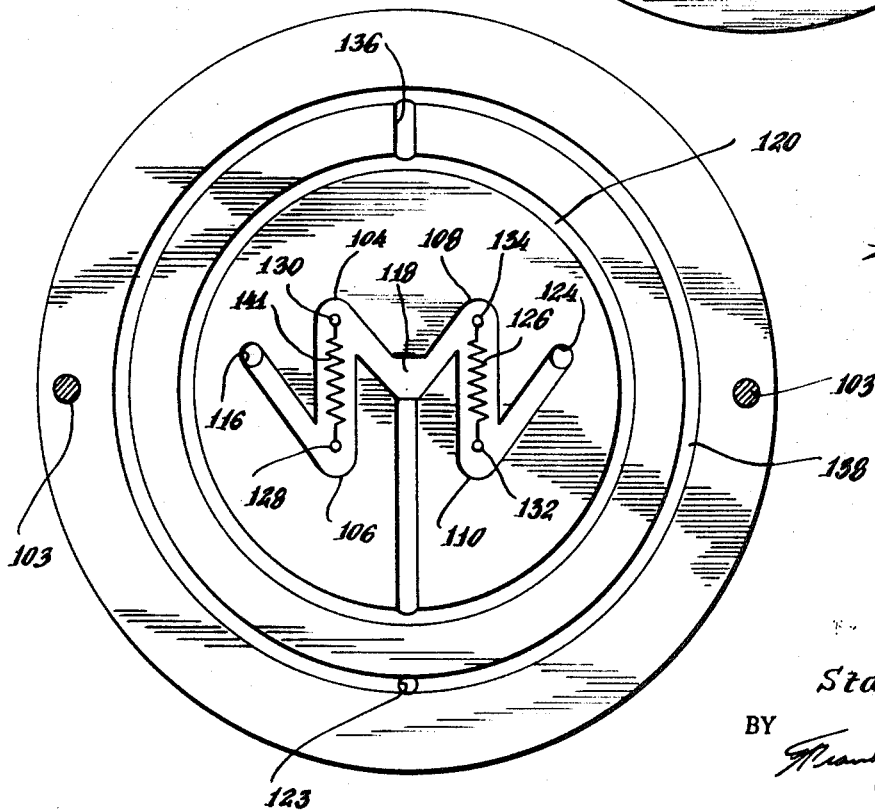

DETECTOR ARRANGEMENTS FOR ANALYTICAL APPARATUS

This is a continuation of application Ser. No. 645,263 filed June 12, 1967 and now abandoned.

This invention relates to analytical apparatus. The invention relates more particularly to an improved detector arrangement for use with an analytical instrument.

In various analytical instruments, such as a chromatographic instrument or a carbon-hydrogen-nitrogen analyzer for example, a detector component is provided for sensing the presence of vaporized sample constituents in a carrier gas stream. A sample-carrying gas is introduced into a detector cell and an electrical output signal indicative of the relative concentration of the sample constituents is thereby provided.

Accuracy of the detector indication requires that the detector cell be removed from influences which could interfere with the indication. In particular, substantial freedom from gas leakage between the detector cell and the surrounding atmosphere is required to avoid the introduction of contaminating atmospheric substances. A thermal conductivity detector includes sensing elements operating at a relatively high temperature. The leakage of small quantities of air into the detector can also result in oxidation of the sensing element causing permanent damage.

It has been found difficult in practice to eliminate all small leakage paths such as may exist between abutting surfaces of elements forming the cell enclosure or leakage in electrical feed-through components of the cell. These leakages can result from tool marks on sealing surfaces, cold flow of deformable metal discs with time, and minute cracks in a glass part of the feed-through. The effects of such small leakage paths can vary with the pressure inside or outside of the detector cell as well as with the flow rate in the detector cell. Prior efforts in correcting the leakage problem have been directed at correcting the individual leakages. Such efforts are costly and the results have not always been satisfactory.

It is an object of this invention to provide an improved form of detector for use with an analytical instrument.

Another object of the invention is to provide a detector arrangement adapted for substantially reducing leakage between a detector cell and a surrounding atmosphere.

A further object of the invention is to provide a detector arrangement adapted for substantially reducing leakage between a detector cell chamber and a surrounding atmosphere and which avoids the prior need for correction of individual leakage paths existing between the cell and a surrounding atmosphere.

In accordance with a feature of the present invention, a detector arrangement for use with an analytical instrument includes a cell having a plurality of members which form a detector chamber and a gas-conductive passageway for conveying a sample-carrying gas through the chamber. Sensing means are positioned in a gas flow path in the chamber for sensing the presence of sample constituents in the gas stream. Sealing means are provided for conducting an inert gaseous medium between the chamber and a surrounding atmosphere for reducing gas leakage therebetween. In accordance with a more specific feature of the invention, the sealing gaseous medium comprises an effluent gas of the detector cell.

These and other objects and features of the present invention will become apparent with reference to the following specifications and drawings wherein:

FIG. 1 is a diagram in block form of an analytical apparatus embodying the present invention;

FIG. 2 is a perspective view of a detector for use with an analytical apparatus and constructed in accordance with features of the present invention;

FIG. 3 is a sectional view taken along lines 3—3 of FIG. 2;

FIG. 4 is an elevation view of a detector illustrating an alternative embodiment of the present invention;

FIG. 5 is a view of the detector of FIG. 4 taken along lines 5—5 of FIG. 4; and

FIG. 6 is another view taken along lines 5—5 of FIG. 4 and illustrating an alternative arrangement of the detector of FIG. 5.

Referring now to FIG. 1, an analytical apparatus is shown to be a chromatographic instrument although other types of analytical instruments requiring similar detectors might equally well be employed. This apparatus is described briefly prior to a detailed description of the detector. A sample under analysis is derived from a sample source 10 and introduced into a separating column 12 via an injector block 14. Carrier gas is derived from a source 16 and is conducted to the injector block 14. The sample, which is vaporized by insertion into the heated injector block is carried by this carrier gas via tubulation 18 to the column 12. As is well known, the separating column causes the constituents of the sample to separate and to elute from the column successively in time. These constituents are carried by the carrier gas through tubulation 20 to a detector 22. The detector 22 is of the nondestructive thermal conductivity type having a first and a second electrical-resistive sensing element disposed in the path of the sample-carrying gas and in the path of a reference gas respectively. The carrier gas also functions as the reference gas for the detector and is introduced thereto via a tubulation 23. A vent port 24 is provided for exhausting the carrier gas and sample to surrounding atmosphere and a vent port 25 is provided for exhausting the reference gas. In a well-known manner, the thermal conductivity detector operates to sense the presence of sample constituents and to generate electrical indications representative of the relative concentration of the different constituents in the sample. These electrical indications are applied to a chart recorder 26.

In order to assure that the detector indications are an accurate representation of the relative concentrations of the sample constituents, detector sensing chambers should be substantially removed from external influences which could otherwise interfere with the generation of an accurate indication. As stated hereinbefore, such influences are partly caused by gas leakage paths existing between the detector cell and the ambient atmosphere. FIG. is a perspective view illustrating the general appearance of a detector 22 which is constructed in accordance with features of the present invention and which is adapted for reducing the effect of such leakages on the detector. A generally cylindrically shaped enclosure 27 includes apertures for receiving the inlet tubulations 20 and 23 for introducing both the sample-carrying carrier gas and the reference gas. Output tubulation 24 and 25 provide for the exhaust of the sample-carrying gas and the reference gas from the enclosure.

FIG. 3, which is a sectional view taken along line 3-3 of FIG. 2, illustrates the detector of FIG. 2 in greater detail. A thermal conductivity detector cell is formed of a plurality of members including a metal block 32, pressure nuts 34 and 36, and deformable discs 38 and 40. The block 32 includes a first cavity which together with the disc 38 defines a reference chamber 42, and a second cavity which together with the disc 40 defines detector chamber 44. Segments of the cavity walls are threaded and the pressure nuts are screwed into the cavities with sufficient force for deforming the associated disc. A gastight seal is thereby provided at this point in the chamber. The block 32 also includes a gas-conductive passageway 46 for conducting a gas between an inlet port 47 and the reference chamber 42, and from the reference chamber to an outlet port 48. A similar gas-conductive passageway 49 is provided in the block 32 for conducting a gas and a sample between an inlet port 50 and the detector chamber 44, and from the detector chamber 44, to an outlet port 51.

An electrical sensing element employed in thermal conductivity hot-wire detectors comprises an electrical resistance element 52 supported in the reference chamber 42 by a feed-through electrical connector 53 which is mounted on the disc 38. A second similar electrical resistance element 54 is supported in the sensing chamber 44 by a feed-through electrical connector 56 which is mounted on the deformable disc 40. Electrical connection between these elements and known hot-wire bridge circuits are made via standoff insulator segments of the feed-through connectors 53 and 56 and a feed-through connector 58 mounted on a wall of enclosure 27.

The detector enclosure 27 is formed of two generally symmetrical segments which when welded at their juncture surfaces 59 form a generally cylindrical enclosure. The inner volume of enclosure 27 is greater than the volume of the cell positioned therein and the intermediate volume defined between the enclosure and cell is occupied by a porous gas-permeable material 59, such as diatomaceous earth. This material functions to reduce turbulence and thus reduces convective noise cause by a gas flowing in this space, as described hereinafter. The tubulation 20 entered the enclosure 27 at an aperture 62 and a gas seal is provided at this point by suitable welding, brazing, or soldering.

This tubulation extends through the porous material 60 and enters the passageway 49 of block 32 at the inlet port 50. A sample is transported by the carrier gas to the chamber 44 through this tubing, and, from the chamber 44 by the exhaust tubing 24 which extends through the passageway 49 of block 32, through an outlet port 51, through the porous material 60 and on outlet aperture in the enclosure 27. Similarly, the reference gas is introduced to the chamber 42 by the tubing 23 which extends through an aperture 68 in the enclosure 27 through the porous material and into the passageway 46. Exhaust of the reference gas from the chamber 42 is provided through a tubulation 70 which extends through passageway 46 and outlet port 48. The tubulations thus described as gas sealed at the various ports and apertures by suitable welding, brazing or soldering.

In accordance with a feature of the present invention, the reference gas is initially exhausted to the enclosed volume, rather than directly to atmosphere. The reference gas flows through the space between enclosure 27 and the cell and exhausts to atmosphere through the tubulation 25 which is mounted at an outlet aperture 72 of the enclosure.

The flow rate of the reference gas is adjusted by any suitable flow-regulating means to a value suitable for preventing upstream diffusion of air through the outlet tubing 25. The reference gas in the enclosed volume flows over the outer surfaces of the detector cell and surrounds the cell. Thus, any leakage into the cell chamber would comprise a flow of inert reference gas which merely acts to vary the indicated concentration slightly. Any leakage in a reverse direction from the cell into the intermediate space of the enclosed volume is reduced by the presence of the reference gas on the outer surfaces of the cell. The enclosed volume may be dimensioned for establishing the flow rate of the reference gas therein equal to the flow rate of the gases in the chambers 44 and 42. A substantial pressure differential would not exist and leakage is substantially inhibited.

In FIG. 4, an alternative embodiment of the detector arrangement of the present invention is illustrated. The detector cell of FIG. 4 comprises a thermal conductivity detector formed from two members, 100 and 102. The member 102 includes a channel formed in its surface (FIG. 5) while a mating surface of member 100 has a generally smooth surface. When these members are assembled and secured together by bolts 103 as shown in FIG. 4, gas passageways and detector and reference chambers are formed. A reference chamber is indicated as that portion of the channel extending between arcuate segments 104 and 106 and a detector chamber is indicated as that portion of the channel extending between arcuate segments 108 and 110. Reference and detector electrical sensing elements 141 and 126 are supported in their respective chambers by electrical feed-through connectors 128, 130, 132 and 134. The reference gas is introduced to the reference chamber through a tubulation 112 which is gas sealed to an inlet port 114 and through a gas passageway including an aperture 116 in the member which communicates with a channel segment extending between this aperture and the arcuate segment 106. This reference gas passageway also includes an exhaust segment extending from the arcuate segment 104 of the channel to a channel junction 118. Similarly, the carrier gas and sample are introduced to the detector chamber through tubing 120, and inlet port 122 and a gas passageway including an aperture 124 in the member 102 which communicates with the channel segment extending between this aperture and the arcuate segment 110. The carrier gas and sample passageway also includes an exhaust segment extending from the arcuate segment 108 to the junction 118. Exhausted gas from the reference and detector chamber combine at the junction 118 and are conveyed through a sealing passageway formed by the annular channel segment 120 to an exhaust port 123. The flow of exhaust gases in the passageway 120 forms a seal and a leakage guard band about both the reference and detector chamber.

FIG. 6 illustrates another arrangement of the embodiment of the invention illustrated in FIG. 5 wherein a plurality of sealing passageways are provided. The flow of gases from the sealing passageway 120 is conducted via a channel segment 136 to a second annular passageway 138. Gases are exhausted from this passageway through the exhaust port 123. Additional sealing passageways can be provided in a similar manner. Further, the passageway 120 may comprise a spiral channel providing a plurality of guard bands which leads to an exhaust port. An improved detector arrangement for analytical apparatus has been described which includes a flowing gas medium functioning as a guard band for reducing flow between a detector cell chamber and atmospheric environment and which advantageously reduced the effects of leakage paths existing therebetween.

While I have illustrated and described a particular embodiment of my invention, it will be understood that various modifications may be made therein without departing from the spirit of the invention and the scope of the appended claims.

I claim:

1. In an analytical instrument having an analytical section, a source of carrier gas coupled to an inlet of the analytical section, and a detector coupled to an outlet of the analytical section, an improved detector arrangement comprising:

a detector cell having a plurality of members forming at least one chamber and a gas conducting passage including an inlet port and an effluent gas outlet port for conducting a carrier gas to and away from said one chamber;

sensing means positioned in said one chamber and adapted for sensing the presence of sample constituents in a carrier gas;

means for coupling the inlet port of said detector to said analytical section for providing a gas flow passage therebetween; and, means providing an enclosed carrier gas flow passage extending over surfaces of said cell between said one chamber outlet port and atmosphere for conducting the effluent of said one chamber around said chamber and for venting to atmosphere thereby reducing leakage between said chamber and atmosphere.

2. The apparatus of claim 1 wherein said detector cell is formed of two chambers comprising detection and reference chambers and said effluent gas comprises an effluent of said reference chamber.

3. The apparatus of claim 1 wherein said one chamber is formed by abutting surfaces of first and second cell members and said flow passage means comprises a gas passageway formed in part by adjoining surfaces of said members.

4. The apparatus of claim 2 wherein said detector cell includes a conductive passageway through each of said chambers, said sensing means includes a sensing and a reference element positioned respectively in said sensing and reference chambers, and said means providing an enclosed passage includes an enclosure for establishing a flow path for surrounding said cell with an effluent gas of said reference chamber.

5. In a thermal conductivity detector arrangement for an analytical apparatus wherein a sample under analysis is introduced thereto:

a detector cell including means forming a sensing and a reference chamber and providing independent gas-conductive passageways through said chambers, each of said passageways having inlet and outlet ports;

first and second electrical sensing elements positioned in said first and second chambers respectively;

a body providing an enclosure for said detector cell and defining an enclosed volume between the cell and body;

means for introducing a sample-carrying gas under pressure from without said second enclosure to said sensing chamber inlet port;

means for introducing the carrier gas under pressure from without said second enclosure to said reference chamber inlet port;

means for conveying an effluent gas from said sensing chamber outlet port to a point without said enclosure body;

said reference cell outlet port positioned for exhausting an effluent of said reference chamber to said enclosed volume; and, means for venting said enclosed volume to an atmosphere without said enclosure.

6. The detector arrangement of claim 5 including a porous gas-permeable medium positioned in said enclosed volume for reducing convection noise.

7. A thermal conductivity flow through detector comprising;

a first body having a surface thereof;

an inlet port and a outlet port providing a vent to atmosphere formed in said body;

said body having a continuous depression in said surface defining a gas flow channel communicating between said ports;

means positioned in said channel for supporting a resistive temperature-sensing element;

said channel including an annular portion formed about said sensing support means; and, a second body having a surface thereof positioned in abutting relationship with the surface of said first body and defining with said depression a sensing chamber and an enclosed gas passageway for conducting the effluent of said chamber around said chamber thereby reducing leakage between said chamber and atmosphere.

8. The detector of claim 7 wherein said first body includes first and second inlet ports and an outlet port formed in said body and said surface of said second body defines with said depression an enclosed gas passageway and sensing and reference chambers.

9. The detector of claim 7 wherein the depression in said detector includes a plurality of annular segments formed about said sensing support means.